Dec. 15, 1959   C. A. BEST   2,917,273
GEAR-ACTUATED RECIPROCATING VALVE CONSTRUCTION
Filed June 6, 1955   3 Sheets-Sheet 1
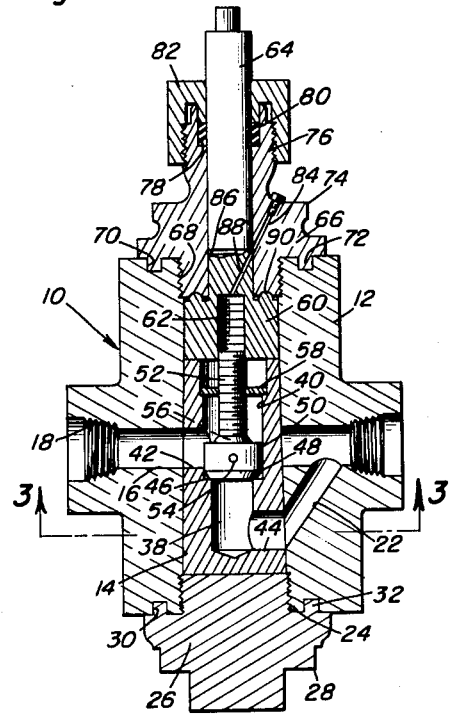
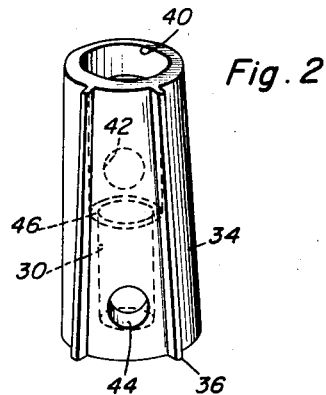
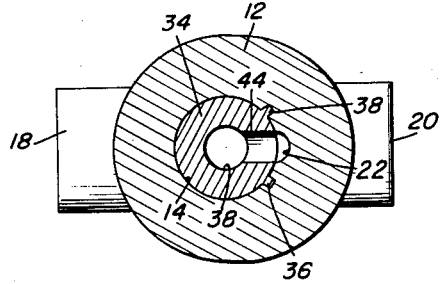
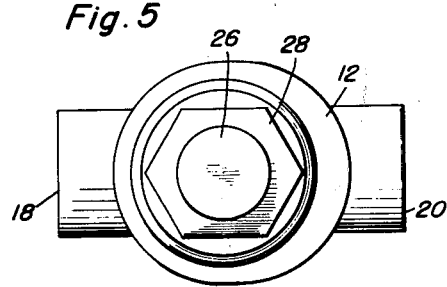
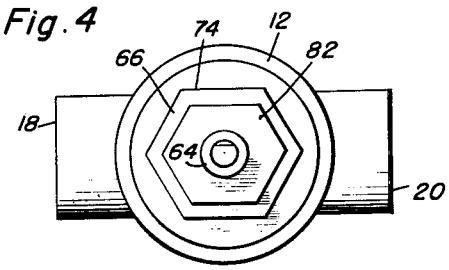
Clarence A. Best
INVENTOR.
BY *Clarence A. O'Brien*
*and Harvey B. Jacobson*
Attorneys Dec. 15, 1959 C. A. BEST 2,917,273
GEAR-ACTUATED RECIPROCATING VALVE CONSTRUCTION
Filed June 6, 1955 3 Sheets-Sheet 2

Clarence A. Best
INVENTOR.

BY *Clarence A. O'Brien*
*and Harvey B. Jacobson*
Attorneys

Dec. 15, 1959            C. A. BEST            2,917,273

GEAR-ACTUATED RECIPROCATING VALVE CONSTRUCTION

Filed June 6, 1955            3 Sheets-Sheet 3

Clarence A. Best
INVENTOR.

United States Patent Office 2,917,273
Patented Dec. 15, 1959

2,917,273

GEAR-ACTUATED RECIPROCATING VALVE CONSTRUCTION

Clarence A. Best, New Albany, Ind.

Application June 6, 1955, Serial No. 513,471

1 Claim. (Cl. 251—248)

This invention generally relates to a valve construction and more specifically provides an improved construction over that of my co-pending application, Serial No. 241,744, filed August 14, 1951, now Patent No. 2,765,143, issued October 2, 1956, of which application this application is a continuation-in-part.

An object of the present invention is to provide a valve construction including a novel body or casing together with a removable and interchangeable insert or adapter wherein a single casing may be utilized for any of various types of valves whereby it will be necessary to provide only interchangeable elements to fit into the basic casing, the casing being formed from block steel thereby eliminating the usual drop forged casings.

Another object of the present invention is to provide a valve construction having a casing wtih interchangeable adapters for positioning therein wherein the casing may be converted for use with various types of valves.

A further object of the present invention is to provide a valve employing a casing having a longitudinal chamber therein that is tapered for receiving a tapered adapter that is interchangeable with other adapters whereby the casing may be utilized for forming various types of valves.

Still another object of the present invention is to provide a valve in accordance with the preceding objects in which the adapter and casing are provided with interengaging locating or positioning means for orientating the adapter properly within the casing.

A still further object of the present invention is to provide a valve in accordance with the preceding objects in which novel means is provided for actuating certain of the valves wherein the valves may be utilized for high pressure systems with very few rotatable joints therein which require a seal, thereby forming substantially a leak-proof valve.

Other objects of the present invention reside in its simplicity of construction, versatility, its interchangeability, adaptation for various purposes and various types of valves, and its relatively inexpensive manufacturing cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a vertical sectional view illustrating one form of the valve construction of the present invention;

Figure 2 is a perspective view illustrating the adapter utilized in the construction of Figure 1;

Figure 3 is a horizontal sectional view taken substantially upon a plane passing along section line 3—3 of Figure 1 illustrating the adapter and its locating means in relation to the casing;

Figure 4 is a top plan view of the construction of Figure 1;

Figure 5 is a bottom plan view of the construction of Figure 1;

Figure 6:
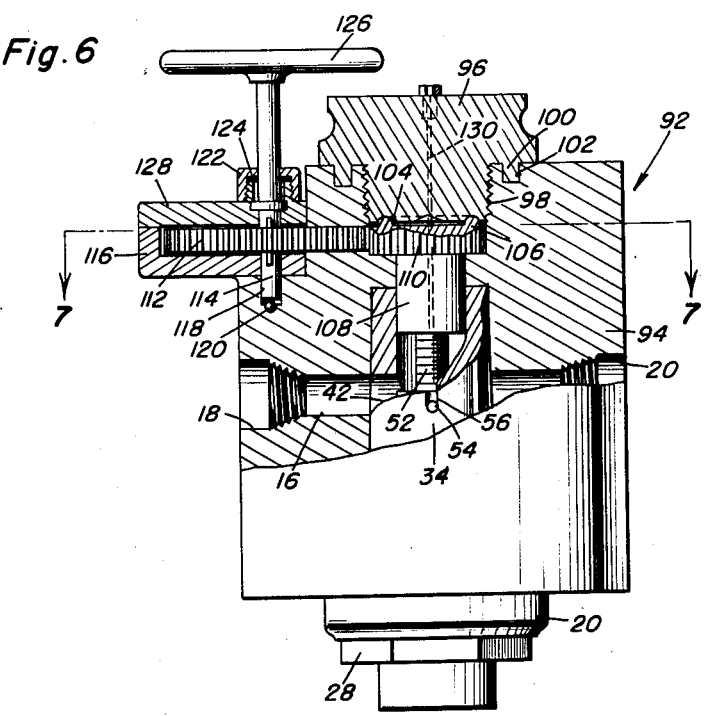
Figure 6 is a side elevational view with portions thereof being shown in section and illustrating another form of the present invention based upon the construction of Figure 1 and utilizing a gear operating means.

Referring now specifically to the drawings, it will be seen that the numeral 10 generally designates the valve construction of the present invention including a body or casing 12 having a longitudinal tapered chamber 14 extending vertically therein and a transverse passage 16 terminating in an outlet port 18 and an inlet port 20 and communicating with the chamber 14. The body or casing 12 is also provided with an angular passageway 22 communicating with the inlet port end of the transverse passage 16.

The lower end of the chamber 14 is screw-threaded, as designated by the numeral 24, for receiving a closure cap 26 having a polygonal lower end 28 for engagement by a suitable wrench. The surface of the casing 12 is provided with an annular groove 30 for receiving an annular projection 32 on the closure nut 26 thereby forming a tightly sealed chamber 14.

Positioned within the chamber 14 is an elongated cylindrical adapter 34 which is slightly tapered from the bottom end to the top end for engagement within the tapered chamber 14. The adapter 34 is provided with at least a pair of longitudinal ribs 36 which are in spaced relation for engagement with longitudinal grooves 38 in the sidewall of the chamber 14 whereby the tapered cylindrical adapter 34 will be accurately positioned within the chamber 14 and held therein by the inner surface of the closure nut 26 engaging the bottom of the adapter 34.

The adapter 34 is provided with a longitudinal passage 38 adjacent its lower end which passage terminates at its upper end in an enlarged bore 40. The passage 38 communicates with a transversely extending passage 42 which is disposed in alignment with the passageway 16 and the botttom of the longitudinal passage 38 is in alignment with a transverse passage 44 which is in registry with the angular passage 22 in the casing 12 that is communicated with the inlet port 20. The arrangement of the passages 42, 44 and 38 permits flow of fluids from the inlet port 20 through to the outlet port 18. The upper end of the passage 38 is provided with a valve seat 46 for receiving the tapered lower end 48 of a valve plug 50. The valve plug 50 reciprocates in the enlarged bore 40 and is provided with a longitudinally extending threaded stud 52 formed integrally with the plug 50. The plug 50 is provided with a radially projecting pin 54 for sliding engagement in a vertical groove 56 (Fig. 6) in the wall of the bore 40 thereby preventing rotation of the plug 50 in relation to the adapter 34. A sealing washer 58 is provided in close surrounding relation to the threaded stud 52 thereby forming a support and seal therefor.

Rotatably journaled in the upper end of the chamber 14 is a rotatable member 60 having an internally threaded socket or bore 62 which is in threaded engagement with the threaded stud 52 of the valve plug 50. The upper end of the rotatable member 62 is provided with an elongated cylindrical shank 64 journaled in a closure plug 66 which is in screw-threaded engagement with the upper end of the chamber 14 as designated by the numeral 68. The upper end of the casing 12 is provided with an annular groove 70 for receiving an annular projection 72 on the closure plug 66 thereby forming a sealed casing 12. The nut 66 is provided with a polygonal portion 74 for receiving a suitable wrench for manipulation thereof. The upper end of the nut 66 is provided with a screw-threaded extension 76 having a recess 78 therein for receiving sealing material 80 and a packing nut 82 is positioned on the cylindrical member 64 in engagement with the sealing material 80 and in threaded engagement with the threaded portion 76 of the nut 66 whereby the packing nut 82 may be tightened for sealing the cylindrical member 64 for rotation. The upper end of the cylindrical member 64 may be provided with a handle for manipulation thereof as desired. Also, the nut 66 is provided with a passageway 84 for receiving grease and the cylindrical member 64 is provided with an annular groove 86 communicating with the passage 84 for receiving the grease and the shank or member 64 is provided with a passageway 88 for permitting grease to be discharged into the threaded bore 62 whereby the threaded connection between the rotatable member 60 and the threaded shank 52 of the plug 50 may be lubricated for ease of operation.

In the operation of the valve 10, rotation of the shank 64 will reciprocate the plug 50 thereby selectively seating the tapered end 48 of the plug 50 on the valve seat 46 in the adapter 34 and thereby selectively closing the passageways 38 and 42 in the adapter 34 for sealing the inlet port 20 from the outlet port 18 and closing the transverse passage 16 in the body 12. Accordingly, it will be readily apparent that the only sealing necessary to eliminate inner leaks is the sealing of the rotatable cylindrical portion 64. Also, it will be noted that the rotatable member 60 is provided with an annular rib 90 in engagement with the lower end of the nut 66 for aligning the rotatable member 60 with the threaded stud 58 for accurate operation thereof.

Figure 7:
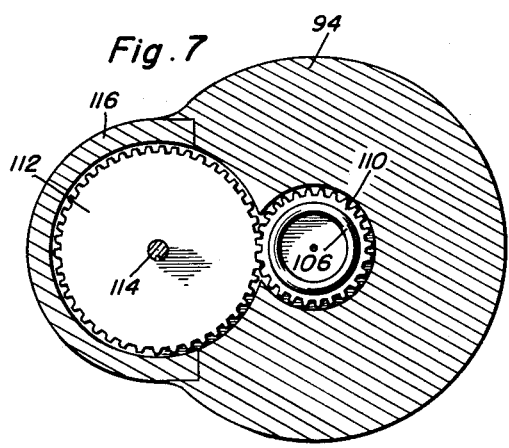
Figure 7 is a horizontal sectional view taken substantially upon a plane passing along section line 7—7 of Figure 6 illustrating the relationship of the driving gears.

Referring now specifically to Figures 6 and 7 of the official drawings, it will be seen that the numeral 92 generally designates a modified form of the valve construction of the present invention including a body member 94 which is substantially similar in internal construction to that illustrated in Figure 1 and is identical as to the construction of the adapter 34 and all of its associated elements.

The casing 94 is provided with a closure nut 96 on the upper end thereof that is in screw-threaded engagement therewith at 98. The nut 96 is provided with a depending annular flange 100 for engagement with an annular groove 102. The lower end of the nut 96 is provided with an annular groove 104 for engagement with an annular projection 106 on the upper end of a rotatable member 108 which is equivalent to the rotatable member 60 in the construction of Figure 1. The rotatable member 108 is provided with a gear 110 on the upper end thereof which is integral therewith. The gear 110 is in meshing engagement with a larger driving gear 112 that is mounted on a vertical shaft 114 journaled in a housing 116. The lower end of the shaft 114 is journaled in a bore 118 in the casing 94 and is positioned on a spherical ball member 120 which acts as a bearing for the lower end of the shaft 114. The upper end of the shaft 114 extends through a packing nut 122 having a sealing member 124 thereunder and is provided with a handle 126 on the upper end thereof for rotation of the gear 112 thereby rotating the rotatable member 108. The housing 116 is provided with a removable cover 128 and the housing and the cover 128 may be removed from the casing 94 when desired.

The nut 96 is provided with a suitable lubrication passage 130 for the same purpose as the lubricating passage in the construction of Figure 1. It will be seen that the construction of Figures 6 and 7 operates in the identical manner as that illustrated in Figure 1 except for the actuating means for the rotatable member 108. The remainder of the structure is the same and is designated by the same reference numerals. The hand wheel 126 permits operation of this device in a remote position and at a much more rapid rate in view of the step-up ratio of the gears 110 and 112.

Figure 8:
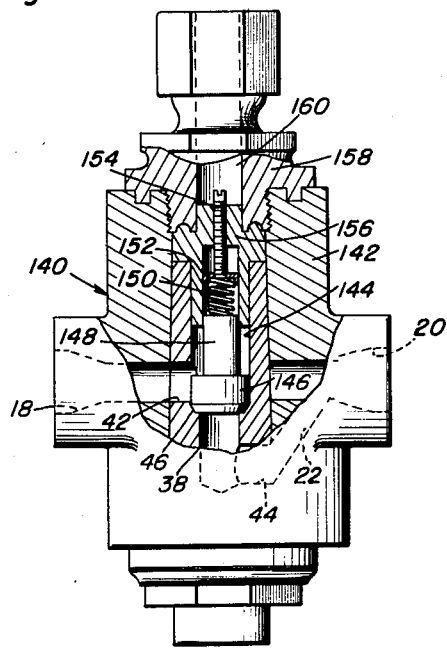
Figure 8 is a side elevational view with portions thereof being shown in section and showing a modified form of the valve construction adapted for use as a check valve.

Referring now specifically to Figure 8 of the drawings, it will be seen that the numeral 140 illustrates the check valve utilizing the basic housing of the present invention which is designated, in this case, by the numeral 142 and is identical to the construction illustrated in Figure 1. The adapter is identical except for the upper end of its chamber which is provided with a smooth bore 144 slidably receiving the reciprocating valve plug 146 that is provided with a smooth projecting shank 148 having a compression spring 150 seated on the upper end thereof and in engagement with a compression plate 152 mounted on the lower end of a screw-threaded member 154. The latter extends through a threaded bore in a closure plate 156 that is engaged by the closure nut 158 provided with a longitudinal bore 160 therethrough for receiving a tool for engagement with the upper end of the screw-threaded member 154 for varying the resiliency of the spring 150 so as to adjust the pressure at which fluid entering through the inlet port 20 and the passages 22, 44 and 38 will lift the valve plug 146 from the valve seat 46.

Figure 9:
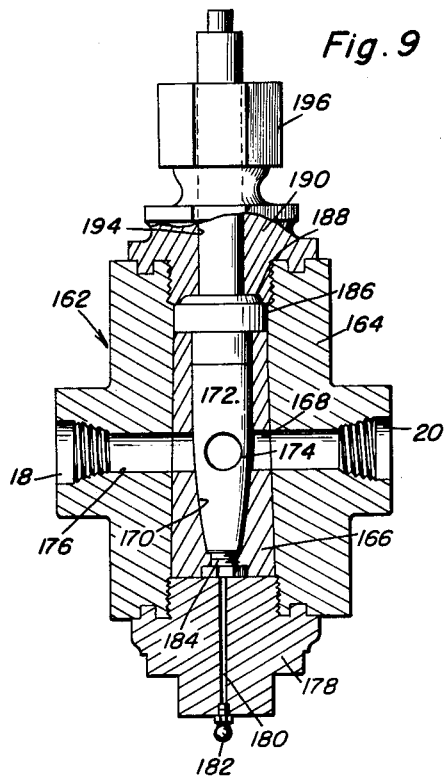
Figure 9 is a sectional view similar to Figure 8 and illustrating another form of the valve construction of the present invention wherein a rotatable tapered plug is provided within the adapter thereby forming a plug cutoff type valve.
Figure 11:
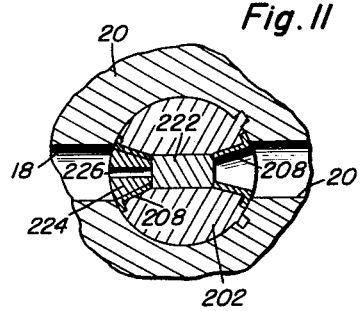
Figure 11 is a horizontal sectional view taken substantially upon a plane passing along section line 11—11 of Figure 10 illustrating the specific construction of the gate and the adapters therefor; and, Figure 12 is a perspective view illustrating the rotatable plug utilized in the valve construction of Figure 9.

Referring now specifically to Figures 9 and 11 of the drawings, it will be seen that the numeral 162 illustrates the tapered plug type of valve construction utilizing the casing 164 identical in construction to that of Figure 8 and the adapter 166 is provided with a single transverse bore 168 and with a tapered longitudinal bore 170 receiving a tapered valve plug 172 having a bore 174 extending therethrough which is selectively alignable with the transverse passage 176 in the valve body 164.

The nut 178 on the lower end of the casing 164 is provided with a lubrication passage 180 having a suitable fitting 182 at the lower end thereof for providing lubrication to the tightening nut 184 on the lower end of the tapered plug 172 and permitting easy rotation of the tapered plug 172 within the adapter 166. The plug 172 is provided with a peripheral flange 186 adjacent the center thereof for engagement with the upper end of the adapter 166 and the flange 186 is provided with an annular projection 188 on the upper end thereof for engagement with the annular groove in the lower end of the upper closing nut 190 which is identical in construction to the nut 158 of Figure 8.

Figure 12:
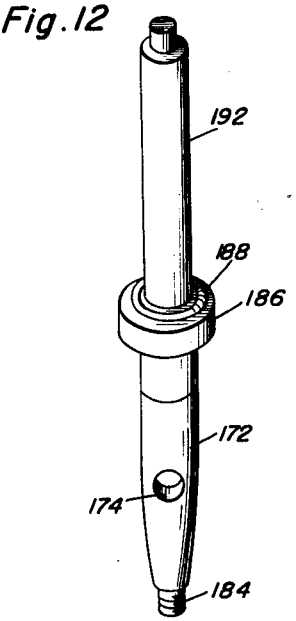

It will be seen that the plug valve of Figures 9 and 12 may be easily manipulated and the valve construction may be easily changed to another type valve by removal of the plug 172 in the usual manner. The upper end of the tapered plug 172 is provided with a cylindrical portion 192 that projects upwardly through the longitudinal bore 194 in the nut 190 to a point above the packing nut 196 for engagement by a suitable rotating handle.

Figure 10:
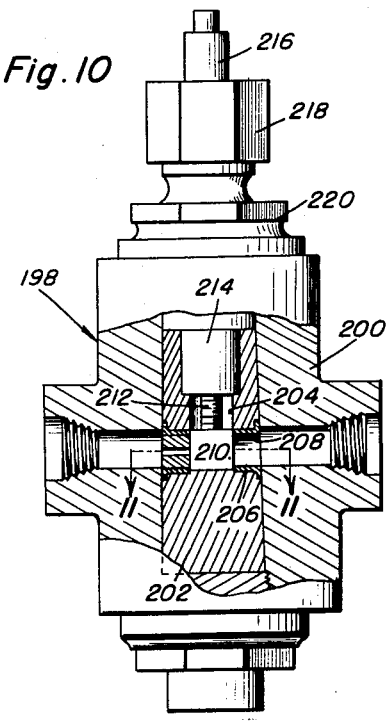
Figure 10 is a side elevational view similar to Figure 8 with portions thereof shown in section and illustrating the valve constructed as a gate valve having a slidable and reciprocating gate.

Referring now specifically to Figures 10 and 11 of the drawings, it will be seen that the numeral 198 illustrates another modified form of the present invention wherein a gate valve is provided and the casing 200 is identical in construction to that employed in Figure 9. The adapter 202 is provided with a longitudinal bore 204 extending to substantially the center thereof which communicates with a transverse bore 206 having a pair of tubular valve seat forming members 208 which are press fitted into the ends of the transverse bore 206 in communication with the longitudinal bore 204 and terminate in mutually spaced relation for receiving a gate valve plug 210 that is provided with a threaded stud 212. The latter engages a rotatable member 214 which is provided with an elongated cylindrical portion 216 extending exteriorly of the packing nut 218 and closing nut 220 for manipulation of the gate valve 210. The gate valve 210 is generally elongated and the sleeve members 208 are tapered as shown. The sleeve member 208 at the outlet side of the valve is provided with a closure plug 224 having a passage 226 therethrough whereby the flow of fluid through the valve 198 may be throttled to a desired capacity by changing the plug 224 and varying the size of the aperture 226 therein.

The construction of Figures 10 and 11 operates in substantially the same manner as the construction of Figure 1 whereby rotation of the handle of the valve will cause reciprocation of the gate valve plug 210.

In each of the forms of the invention illustrated, a single casing may be provided wherein various adapters may be inserted for converting the casing from one type of valve to another, thus eliminating the necessity of obtaining a complete valve assembly when a certain type of valve is desired. This will permit the use of certain standardized elements for valves of various constructions wherein persons having supplies of the various interchangeable elements may construct any type of valve desired by utilizing a combination of the proper elements. For instance, the grooved valve construction of Figure 1 or Figure 6 may be easily converted to the check valve arrangement of Figure 8, the tapered plug arrangement of Figure 9 or the gate valve arrangement of Figure 10 by utilizing different internal elements but relying upon the same basic casing and other identical basic elements in certain instances. This will greatly facilitate the handling and supply of such valves and reduce the necessary expenditures for retaining various types of valves in readiness for use.

In view of the simplicity of construction and the minimum of relatively movable parts, the sealing problem has been substantially overcome thereby permitting the valve construction of the present invention to be utilized in conjunction with high pressure fluids without danger and waste caused by leakage.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

In a valve, the combination of a vertically disposed substantially cylindrical casing provided with an axially extending substantially cylindrical chamber having screw-threaded upper and lower end portions and a diametrically reduced intermediate portion adjacent the upper end portion, the side wall of said chamber being formed with a longitudinally extending groove, a substantially cylindrical adapter removably positioned in said chamber, a longitudinal rib provided on the outer surface of said adapter and seated in said groove whereby to prevent rotation of the adapter in the chamber, a closure nut threaded in the lower end portion of said chamber and abutting the lower end of said adapter, the upper end of the adapter being in abutment with said diametrically reduced portion of the chamber, said adapter being provided with an axially extending cylindrical passage having a closed lower end and an open upper end and formed intermediate its ends with an upwardly facing valve seat, said casing and said adapter being provided at one side thereof with an inlet port communicating with the lower end of said passage and at the opposite side thereof with an outlet port communicating with said passage at a point above said valve seat, a valve plug slidable upwardly and downwardly in said passage and engageable with the valve seat in its downwardly slid position, a radially projecting pin provided on said plug and slidable in a slot formed longitudinally in said adapter whereby to prevent rotation of the plug in said passage, a screw-threaded shank rigid with and projecting upwardly from said plug, an internally threaded actuating member operatively engaging said shank and rotatably disposed in the diametrically reduced portion of said chamber and in the upper end portion of the passage in said adapter whereby said plug may be slid upwardly and downwardly by rotation of said actuating member, a relatively small gear provided integrally on said actuating member above and in abutment with the diametrically reduced portion of said chamber, a closure cap threaded in the upper end portion of said chamber and abutting said relatively small gear whereby to prevent axial movement of said actuating member, a vertical shaft rotatably journalled in the upper end portion of said casing at one side of said chamber and projecting upwardly therefrom, a relatively large gear secured to said shaft in said casing and meshing with the first mentioned gear whereby to transmit rotation of said shaft to said actuating member, and handle means provided on the projecting portion of said shaft for rotating the same.

References Cited in the file of this patent

UNITED STATES PATENTS

| Number | Name | Date |
|---|---|---|
| 56,409 | Hamilton | July 17, 1866 |
| 74,597 | Rodier | Feb. 18, 1868 |
| 334,079 | Mason | Jan. 12, 1886 |
| 461,084 | Pratt | Oct. 13, 1891 |
| 660,193 | Loetzer | Oct. 23, 1900 |
| 702,342 | Clough | June 10, 1902 |
| 827,521 | Felsberg | July 31, 1906 |
| 942,972 | Palmer | Dec. 13, 1909 |
| 1,218,877 | Long | Mar. 13, 1917 |
| 2,078,402 | McDonough | Apr. 27, 1937 |
| 2,186,499 | Riva | Jan. 9, 1940 |
| 2,765,143 | Best | Oct. 2, 1956 |